United States Patent [19]

Laube

[11] Patent Number: 4,991,819
[45] Date of Patent: * Feb. 12, 1991

[54] METERING VALVE

[75] Inventor: Daniel J. Laube, Oak Park, Ill.

[73] Assignee: Chicago Faucet Company, Des Plaines, Ill.

[ * ] Notice: The portion of the term of this patent subsequent to Feb. 13, 2007 has been disclaimed.

[21] Appl. No.: 477,727

[22] Filed: Feb. 9, 1990

Related U.S. Application Data

[63] Continuation-in-part of Ser. No. 336,887, Apr. 12, 1989, Pat. No. 4,899,778.

[51] Int. Cl.5 .......................................... F16K 31/143
[52] U.S. Cl. ...................................... 251/35; 137/242; 251/39
[58] Field of Search .................... 137/242; 251/35, 39, 251/900

[56] References Cited

U.S. PATENT DOCUMENTS

| | | | |
|---|---|---|---|
| 2,000,297 | 5/1935 | Putnam | 251/35 X |
| 2,532,568 | 12/1950 | Myers | 251/33 X |
| 3,047,018 | 7/1962 | Lucien | 251/900 X |
| 3,400,731 | 9/1968 | McCornack | 251/39 X |
| 3,842,857 | 10/1974 | McCornack | 251/39 X |
| 4,272,052 | 6/1981 | McCornack | 251/39 |
| 4,361,168 | 11/1982 | McCornack | 251/39 X |
| 4,899,778 | 2/1990 | Laube | 137/242 |

Primary Examiner—Gerald A. Michalsky
Attorney, Agent, or Firm—Neuman, Williams, Anderson & Olson

[57] ABSTRACT

A metering valve is provided having a piston assembly mounted for movement between open and close modes. The piston assembly is biased to assume a close mode. The piston assembly assumes an open mode only when a predetermined external force is applied to a valve actuating element forming a component of the metering valve. When the external force is removed, the piston assembly automatically returns to the close mode. The rate of movement of the piston assembly during a first segment of travel from the open mode to the close mode is substantially slower than the rate of movement during a second segment of the travel.

5 Claims, 1 Drawing Sheet

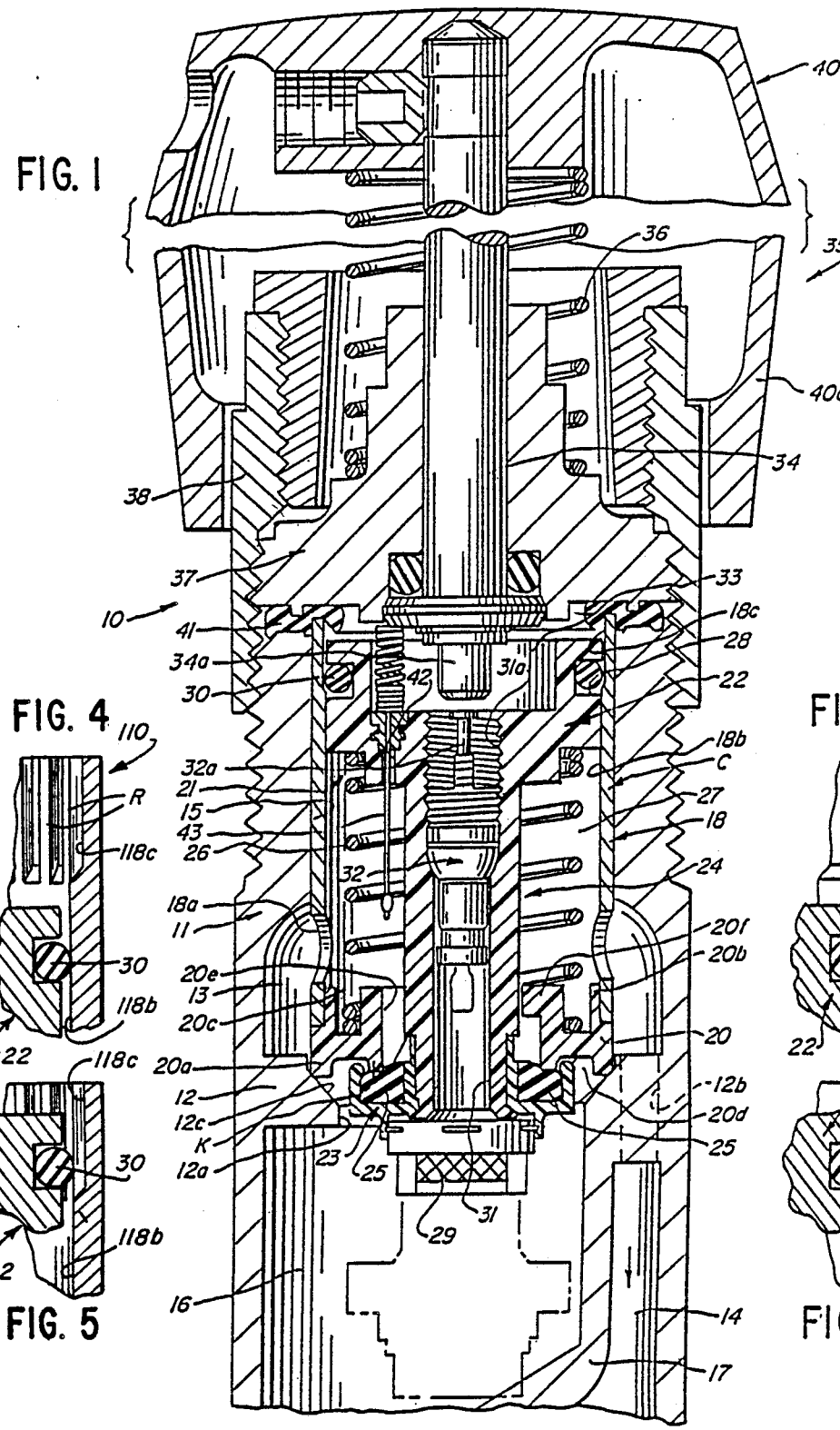

METERING VALVE

This application is a continuation-in-part of my application Ser. No. 336,887 filed Apr. 12, 1989, now U.S. Pat. No. 4,899,778.

BACKGROUND OF THE INVENTION

Various metering valves, such as disclosed in U.S. Pat. No. 3,842,857, have heretofore been utilized in wash basins, toilets, urinals and the like which are installed in public or commercial buildings, factories, schools and churches. Such valves, when actuated, allow only a predetermined volume of water to be dispensed in a given period of time. It has been found, however, that such prior valves are beset with a common problem; namely, that the shut-off is gradual so that near the end of the shut off cycle the flow is minimal and of no practical value and thus, is wasted. Where a large number of such prior valves are installed in a facility and are subjected to frequent use, the amount of wasted water or fluid can be significant.

A further problem frequently besets such prior valves, namely, leakage due to the valve not being completely shut off.

In attempting to rectify such problems, strong closure springs were often utilized; however, such springs are more costly and require greater manual force to open the valve. For young and elderly persons, such additional manual force is at times difficult, if not impossible, to attain.

SUMMARY OF THE INVENTION

Thus, an improved metering valve has been provided which is of simple, inexpensive, yet durable construction.

The improved metering valve is easy to service and maintain and does not require increased manual effort to operate.

The improved metering valve attains a crisp, automatic shut off as opposed to a gradual shut off and thus, is more efficient to operate.

Further and additional advantages of the improved metering valve will become apparent from the description, accompanying drawings and appended claims.

In accordance with one embodiment of the invention, an improved metering valve is provided which includes a piston assembly mounted for movement between open and close modes. The piston assembly is biased to normally assume a close mode and assumes an open mode only when a predetermined external force is applied to a valve actuating element, the latter forming a component of the metering valve. When the external force is relieved, the piston assembly automatically returns to its close mode. The rate of movement of the piston assembly during a first segment of travel from the open mode to the close mode is slower than the rate of movement during a second, or final segment of travel, thus, a crisp shut off is effected by the piston assembly.

DESCRIPTION

For a more complete understanding of the invention reference is made to the drawings wherein;

FIG. 1 is an enlarged, fragmentary, vertical sectional view of one embodiment of the improved metering valve, shown in full lines in a close mode and in phantom lines in an open mode.

FIGS. 2 and 3 are enlarged fragmentary vertical sectional views of a portion of the valve of FIG. 1 and showing the piston assembly thereof, respectively in first and second segments of travel.

FIGS. 4 and 5 are similar to FIGS. 2 and 3 respectively, but showing a second embodiment of the improved metering valve.

Referring now to the drawings and more particularly to FIG. 1, a preferred embodiment of the improved metering valve 10 is shown which is suitable for use in wash basins, flush toilets, urinals and the like. The valve includes a housing 11 which is provided with an internal collar 12 defining a central opening 12a. Disposed above the collar is a cavity 13 which communicates via a passage 12b formed in the collar, with an outlet 14 provided within the interior of the housing 11. The passage 12b is radially offset relative to the central opening 12a.

Disposed above cavity 13 and communicating therewith is a central bore 15 formed in the interior of the housing. Mounted within bore 15 is a replaceable cartridge C, which will be described more fully hereinafter.

Formed within the interior of housing 11 and disposed beneath the internal collar 12 is an inlet 16 which is connected to a source of pressurized water, not shown. The inlet 16 is separated from outlet 14 by a partition 17 formed within the interior of the housing 11. The upper end of the partition is integral with and depends from collar 12.

Cartridge C, as shown in FIG. 1, includes a sleeve 18 having the exterior thereof sized to slidably fit within bore 15. The interior of the sleeve 18 includes a longitudinally extending first portion 18b and a longitudinally extending second portion 18c which is longitudinally aligned with the first portion. The second portion is adjacent the upper end of the sleeve and is relatively short in length compared to the first portion. Affixed to the lower end of sleeve 18 is an end piece 20 having a depending peripheral flange 20a which is adapted to abuttingly engage a counter-sunk portion 12c formed at the upper end of central opening 12a.

Extending in the opposite direction from flange 20a and offset radially inwardly therefrom is an upwardly extending rib 20b which fits within the end of sleeve 18 and engages the interior surface thereof. The amount of offset of rib 20b corresponds substantially to the thickness of the sleeve. Formed radially inwardly from rib 20b is an annular channel 20c. Aligned beneath channel 20c is a second downwardly facing channel 20d which is formed in end piece 20. A center opening 20e is provided in the end piece. A plurality of symmetrically arranged, radially oriented web fingers 20f project inwardly from the periphery of opening 20e. The function of these fingers will be described more fully hereinafter.

The lower end of the sleeve first portion is provided with a plurality of ports 18a which communicate with the interior cavity 13 of housing 11. Reciprocally mounted within sleeve 18 is a piston assembly 21. The piston assembly includes an enlarged upper end portion or head 22 and a smaller lower end portion or head 23. The two end portions are interconnected by a tubular center portion 24. Affixed to the lower end portion 23 is a seal piece 25 which may be molded into the lower end portion thereby simplifying the structure thereof. The piston assembly is biased by a coil spring 26 to normally assume a close, or shut-off, position whereby the seal piece 25 sealingly engages an annular seat K formed on the underside of end piece 20. As noted in FIG. 1 the valve seat K is spaced radially inwardly from flange 20a.

The interior dimension of the lower end portion 23 of the piston assembly is such that it will readily clear the perimeter of collar opening 12a, when the piston assembly is manually actuated to a fully open position, the latter being shown in phantom lines in FIG. 1. When the lower end portion 23 is in the fully open position, the seal piece 25 is located beneath the collar 12 thereby allowing the water from the inlet 16 to pass through a space formed between the exterior of the center portion 24 and the perimeter of the collar opening 12a, and then through end piece opening 20e into an interior chamber 27 formed in sleeve 18. From chamber 27, the water flows through ports 18a into cavity 13 and out through passage 12b to the outlet 14.

The aforementioned coil spring 26 is disposed within chamber 27 and encompasses the tubular center portion 24 of the piston assembly. The lower end of the spring 20 is disposed within the channel 20c formed in end piece 20. The upper end of the spring resiliently engages the underside of the enlarged end portion 22 of the piston assembly.

The exterior of the end portion 22 is provided with a peripheral groove 28 in which is disposed a seal 30 (e.g. an O-ring). The seal 30 is in sliding sealing engagement with the first surface portion 18b of sleeve 18 for a substantial first segment of travel of the piston assembly between the fully open and close positions, see FIG. 2. It is important to note that the inner dimension of second portion 18b of sleeve 18 has a greater diametrical dimension than the first portion, see FIG. 3, so that when the piston assembly is moving upwardly relative to sleeve 18 due to the force of spring 26, the seal 30 will become disengaged from the interior surface of the sleeve second portion 18c. When such disengagement occurs, the resistance to the piston assembly movement is greatly reduced enabling the piston assembly to move quickly to its fully up position producing a crisp, or sudden, closing of the valve. Thus, the undesirable gradual closing of the valve is readily and efficiently avoided.

To maintain proper alignment at all times of the piston assembly within the cartridge sleeve 18, the web fingers 20f provided on end piece 20 slidably engage the exterior of the tubular center portion 24 of the piston assembly.

The piston assembly 21 is provided with a longitudinally extending central bore 31 which extends through the upper and lower end portions 22 and 23, respectively, and the center portion 24. The upper end 31a of bore 31 is internally threaded. Disposed within the bore and threaded into the bore upper end 31a is a small valve 32 which regulates the flow of water from the housing inlet 16 to a small chamber 33 formed in the upper end portion 22 of the piston assembly. A filter 29 is mounted on the underside of the piston head 23 and overlies the open end of bore 31. The valve 32 is normally closed, but is actuated to an open condition by a reciprocating plunger 34 which is mounted within an end cap assembly 35, the latter to be described more fully hereinafter. The lower end 34a of the plunger is disposed within chamber 33 and when the plunger is manually depressed, it will initially engage and depress an upwardly projecting valve stem 32a of valve 32 and cause the latter to open allowing water to flow into chamber 33. Upon continued depression of plunger 34, the lower end of the plunger will engage the upper end portion 22 of the piston assembly and effect downward movement of the piston assembly to the fully open position, shown in phantom lines in FIG. 1. Once the manual depressing force on the plunger has been removed, the plunger will quickly return to its normal up, or rest, position shown in full lines in FIG. 1. The plunger 34 is biased by a coil spring 36 which encompasses the plunger. The lower end of spring 36 engages a guide piece 37 which is threaded into a cap sleeve 38. The upper end of spring 36 engages the underside of a cap 40 which is affixed to and moves with the upper end of plunger 34.

Cap 40 is provided with a depending skirt 40a which encompasses the upper end portion of cap sleeve 38. The lower end of the cap sleeve is threaded onto the upper end of housing 11. As noted in FIG. 1 a suitable seal 41 is positioned between the upper end of the sleeve 18 of cartridge C and the underside of guide piece 37.

The enlarged upper end portion 22 of the piston assembly 21 is provided with a small metering passage 42 which communicate at its upper end with chamber 33 and at its lower end with chamber 27, the latter being formed by cartridge sleeve 18. Loosely disposed within the passage 42 is a non-clogging pin 43 which is adapted to prevent buildup of deposits within the passage. The rate of flow of water from chamber 18 to chamber 33 through passage 42 determines the speed of return of the piston assembly to the fully close position or, in other words, the length of time the water flows from the inlet 16 to the outlet 14. The metering feature incorporated in the piston assembly forms no part of the claimed invention.

FIGS. 4 and 5 disclose a second embodiment 110 of the improved metering valve wherein the sleeve 118 thereof differs from the sleeve 18 of valve 10 in that a sleeve second portion 118c, which extends longitudinally from a sleeve first portion 118b, is provided with internal splines or ribs R. The splines or ribs R may extend in a direction parallel to the longitudinal axis of the sleeve or they may extend in a curve, swirl-like or helical configuration from the end of the sleeve first portion. Furthermore, the number and relative length and width of the splines or ribs R may also vary from that shown. Thus, when the seal 30 disposed within the peripheral groove 28 formed in the upper end portion 22 of the piston assembly, moves from the sleeve first portion 118b to the sleeve second portion 118c, the seal 30 is no longer in sealing relation with the interior surface of sleeve 118. Thus, when there is no longer a sealing relation between the seal 30 and the second portion 118c of the sleeve, there is flow past the seal whereby the resistance to the piston assembly movement is greatly reduced enabling the piston assembly to quickly move to its fully up position producing the desired crisp, sudden closing of the valve. While the seal 30 is no longer in sealing relation with the interior surface of the sleeve 118 when moving within the second portion 118c thereof, the seal nevertheless will be in sliding engagement with the inwardly facing surfaces of the splines or ribs R and thus, the upper end portion of the piston assembly will be guided thereby.

While the improved valve 10 or 110 has been described with regards to the flow of water, it is not intended to be limited thereto, but, the term, water, as used herein is intended to include other liquids, fluids and gases. The various components comprising the improved valve 10 or 110 may vary in size and shape, if desired, from that shown without departing from the scope of the claimed invention. The improved valve is of simple construction and effectively overcomes the aforementioned problems besetting valves of this general type.

I claim:

1. A metering valve for controlling flow through a housing, the latter having an inlet, an outlet, and an internal partitioning means having an opening formed therein, the partitioning means being interposed the inlet and outlet; said metering valve comprising an elongate cartridge mountable within the housing between the partitioning means and the outlet; and valve actuating means mountable on the housing adjacent a first end portion of said cartridge and securing the latter within the housing whereby a second end portion of said cartridge is aligned with the partitioning means opening and is in abutting engagement with a portion of the partitioning means circumjacent the opening; said cartridge including a stationary tubular unit adapted to be secured within the housing between the partitioning means and said valve actuating means, said tubular unit being provided with port means for communicating with the outlet, and a piston assembly slidably mounted within said tubular unit, said assembly having an elongate piston member mounted within said tubular unit and in axial alignment therewith for controlled adjustment between open and close modes; said piston member having a first head portion adapted to be aligned with the partitioning means opening and extending therethrough when said piston member is adjusted to the open mode allowing a primary flow from the inlet through the partitioning means opening and port means to the outlet, said first head portion being biased to normally assume the close mode interrupting the flow through the partitioning means opening, a second head portion spaced longitudinally from said first head portion and disposed adjacent said valve actuating means, and an elongate third portion interconnecting said head portions, said first, second and third portions being provided with a common longitudinally extending internal passage, said second head portion cooperating with said valve actuating means to form therebetween an accumulating chamber in communication with said passage, and second valve means mounted within said passage and adapted to normally assume a close position, said second valve being adjusted to an open position by said valve actuating means allowing a secondary flow of fluid into the accumulating chamber through the passage; said second head portion being provided with a metering means communicating with said chamber and port means and regulating flow therebetween upon said piston assembly moving from the open mode to the close mode; said second head portion further having first and second segments of travel when said piston member moves from the open mode to the close mode with the periphery of said second head portion being in sliding sealing engagement with an interior surface of a first portion of said tubular unit only when said piston assembly is moving through said first segment of travel and the periphery of said second head portion being in a non-sealing relation with an interior surface of a second portion of said tubular unit when said piston assembly is moving through said second segment of travel; the movement of said piston assembly from the open mode to the close mode through said first travel segment being at a slower rate than through the second travel segment.

2. A metering valve for controlling fluid flow, comprising a piston assembly mounted within a tubular unit for movement between open and close modes and being biased to assume a close mode, said piston assembly assuming an open mode only when a predetermined external force is applied to a valve actuating means forming a component of said metering valve; upon the external force being removed, said piston assembly automatically returning to the close mode upon successively moving through first and second segments of travel; said piston assembly being in sliding sealing engagement with an interior surface of said tubular unit when moving through said first segment of travel whereby movement of said piston assembly is retarded allowing a predetermined volume of fluid to flow through the metering valve, said piston assembly being in a non-sealing relation with the tubular unit interior surface when said piston assembly moves through the second segment of travel whereby said piston assembly moves substantially instantaneously to the close mode halting further fluid flow.

3. The metering valve of claim 2 wherein the interior surface of the tubular unit in non-sealing relation with the piston assembly, when the latter is moving through the second segment of travel, is provided with a plurality of annularly-spaced proturbances engaged by said piston assembly.

4. The metering valve of claim 3 wherein the interior surface protuberances of the tubular unit include a plurality of symmetrically arranged splines extending in a substantially longitudinal direction.

5. The metering valve of claim 2 wherein the interior surface of the tubular unit includes a first portion adapted to be sealingly engaged by the piston assembly and a second portion adapted to be in non-sealing relation with the piston assembly, said first and second portions being in endwise alignment and said first portion having a longer longitudinal dimension than said second portion.

* * * * *